Patented Mar. 22, 1949

2,465,320

UNITED STATES PATENT OFFICE 2,465,320

CHALCONES AND PROCESS FOR THEIR MANUFACTURE

Franz Bergel, Aaron Cohen, John Wynne Haworth, and Edward Graham Hughes, Welwyn Garden City, England, assignors to Hoffmann-La Roche Inc., Nutley, N. J., a corporation of New Jersey No Drawing. Application May 2, 1946, Serial No. 666,846. In Great Britain May 30, 1945

18 Claims. (Cl. 260—461)

This invention relates to the manufacture of water-soluble phosphorylated derivatives of chalkones.

The group of compounds known as chalkones may be prepared by the condensation of an aromatic aldehyde, such as benzaldehyde, with acetophenone or a substituted acetophenone in an alkaline medium.

In the simplest case this is expressed by the following reaction:

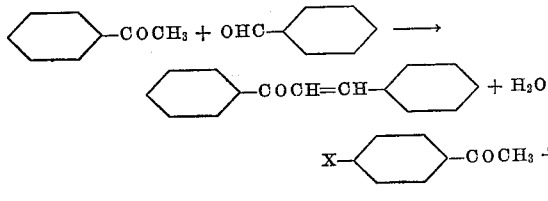

This reaction has been described in the literature using a number of derivatives of acetophenone and benzaldehyde containing substituent groupings, such as hydroxyl or methoxyl groups.

The chalkones so obtained are usually insoluble in water, and those members of the group which contain substituent phenolic hydroxyl groups are only water-soluble in strongly alkaline solutions.

It has been reported that same chalkones, e. g. hesperidine chalkone and hesperidine chalkone methyl ether can function as vitamin P (see Higby, Journal of the American Pharmaceutical Association, vol. 32, year 1943, page 74), and it would be very advantageous to provide a process for synthesizing chalkone derivatives so substituted as to form water-soluble salts.

It has now been discovered according to the present invention that phosphorylated chalkones, more exactly hydroxy-chalkones, can be synthesized, which are capable of forming water-soluble sodium salts. The compounds correspond to the general formula

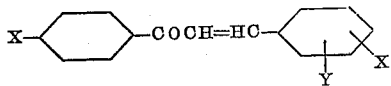

wherein one of the radicals X is the phosphorylated hydroxyl radical, the second radical X is selected from the group consisting of hydrogen, hydroxyl and phosphorylated hydroxyl radicals, and Y is selected from the group consisting of hydrogen, hydroxyl, lower saturated alkyl and lower saturated alkoxy radicals. The 3,4'-dihydroxy - 4 - methoxychalkone - 4' - phosphate, the 4,4'-dihydroxy-3-methoxychalkone-4'-phosphate, the 4,4'-dihydroxy-3-methoxychalkone-4-phosphate, and the salts thereof are especially suitable.

According to the process of the present invention for the manufacture of phosphorylated chalkones a derivative of an aromatic aldehyde is reacted with a derivative of acetophenone, at least one of the reaction components containing at least one phosphorylated hydroxyl group.

Thus, one or both of the reaction components may contain a phenolic hydroxyl group which has been phosphorylated to yield an acidic phosphoric acid ester of the phenolic hydroxy compound.

The reaction may be symbolized by the following formula:

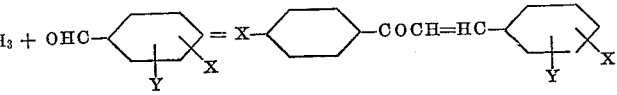

On each side of the equation, one of the radicals X is the phosphorylated hydroxyl radical, the second radical X is selected from the group consisting of hydrogen, hydroxyl and phosphorylated hydroxyl radicals, and Y is selected from the group consisting of hydrogen, hydroxyl, lower saturated alkyl and lower saturated alkoxy radicals. The phosphorylated component in the reaction is conveniently used in the form of its di-sodium salt or similar alkaline metal salt.

The reactants are mixed in aqueous alcoholic solution containing alkali and heated at a slightly elevated temperature, preferably at 30–50° C. The phosphorylated chalkone formed is obtained as a sodium salt by the addition of alcohol to the reaction mixture and this sodium salt contains additional sodium atoms if additional hydroxyl groups are present. Where such a polysodium salt is possible, the free phosphoric acid ester of the hydroxy chalkone is liberated by treatment with acid and is then converted into a di-sodium salt of the phosphoric acid ester by treatment with the calculated amount of sodium hydroxide to form a di-sodium salt which is isolated by crystallization from water on the addition of alcohol. Accordingly, 3,4'-dihydroxy-4-methoxychalkone-4'-phosphate can be obtained by reacting a salt of phosphorylated p-hydroxy-acetophenone with isovanillin, 4,4'-dihydroxy-3-methoxychalkone-4'-phosphate from a salt of phosphorylated p-hydroxy-acetophenone and vanillin, and 4,4'-dihydroxy-3-methoxychalkone-4 - phosphate by condensing p-hydroxy-aceto-phenone with a salt of phosphorylated vanillin. The products obtained by the condensation will suitably be transformed into salts, preferably sodium salts.

Such sodium salts of phosphorylated hydroxy chalkones possess the property of increasing the capillary resistance.

The following examples, in which the parts are by weight, illustrate how the process of the invention may be carried into effect:

*Example 1*

10.4 parts of the di-sodium salt of phosphorylated p-hydroxy-acetophenone are dissolved in 40 parts of cold water and mixed with a solution of 12 parts of isovanillin in 40 parts of warm absolute alcohol, and the mixture is treated with 37.2 parts of a 20% w./v. aqueous solution of sodium hydroxide; the final solution is kept at at 37° C. for 60 hours. The intermediate product is obtained as a solid by the addition of an equal volume of warm absolute alcohol. After crystallization the orange product is filtered, and washed with alcohol; this product is the tri-sodium salt of 3,4'-dihydroxy-4-methoxychalkone-4'-phosphate.

The free phosphoric acid is obtained from an aqueous solution of the tri-sodium salt by acidification with the calculated quantity of dilute hydrochloric acid; the yellow product is separated on a centrifuge and washed on the centrifuge with saturated sodium chloride solution. The product is then dried.

The di-sodium salt of the phosphorylated chalkone is obtained from the free phosphoric acid by solution in a small quantity of water containing the calculated quantity of 2 n caustic soda solution. The final product is obtained by the addition of 10 volumes of hot absolute alcohol followed by cooling. This product is the di-sodium salt of 3,4'-dihydroxy-4-methoxychalkone-4'-phosphate. The phosphorus content is 7.3% (theory 7.85%).

*Example 2*

5.2 parts of the di-sodium salt of phosphorylated p-hydroxy-acetophenone are dissolved in 20 parts of cold water and mixed with a solution of 6 parts of vanillin in 20 parts of warm absolute alcohol, and the mixture is treated with 18.6 parts of a 20% w./v. solution of caustic soda; the final solution is kept at 37° C. for 66 hours.

The rest of the preparation is carried out as described in Example 1.

The product is the di-sodium salt of 4,4'-dihydroxy-3-methoxychalkone-4'-phosphate. The phosphorus content is 7.6% (theory 7.85%).

*Example 3*

3.6 parts of the di-sodium salt of phosphorylated vanillin are dissolved in 15 parts of cold water and mixed with a solution of 3.6 parts of p-hydroxy-acetophenone in 12 parts of warm absolute alcohol, and the mixture is treated with 15 parts of a 20% w./v. aqueous solution of sodium hydroxide; the final solution is kept at 37° C. for 60 hours.

The rest of the preparation is carried out as described in Example 1.

The product is the di-sodium salt of 4,4'-dihydroxy-3-methoxychalkone-4-phosphate. The phosphorus content is 7.4% (theory 7.85%).

We claim:
1. A compound having the formula:

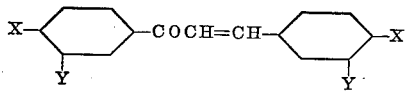

wherein one X represents a radical selected from the group consisting of $-O-PO(OH)_2$ and $-O-PO(O\text{-alkali metal})_2$ and the other X represents a radical selected from the group consisting of $-OH$ and lower saturated alkoxy; and one Y represents a radical selected from the group consisting of $-OH$ and lower saturated alkoxy and the other Y represents hydrogen.

2. A process for the manufacture of mono-orthophosphoric acid esters of dihydroxy-chalcones, which comprises reacting, in an alkaline aqueous medium, an acetophenone of the formula:

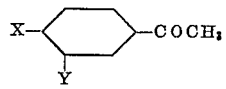

with a benzaldehyde of the formula:

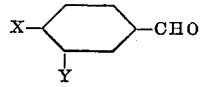

wherein one X represents a $-O-PO(O\text{-alkali metal})_2$ radical and the other represents a radical selected from the group consisting of $-OH$ and lower saturated alkoxy; and one Y represents a radical selected from the group consisting of $-OH$ and lower saturated alkoxy and the other Y represents hydrogen.

3. A process for the manufacture of mono-orthophosphoric acid esters of dihydroxy-chalcones, which comprises reacting, in an alkaline aqueous medium, an acetophenone of the formula:

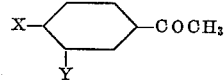

with a benzaldehyde of the formula:

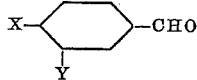

wherein one X represents a $-O-PO(O\text{-alkali metal})_2$ radical and the other represents a radical selected from the group consisting of $-OH$ and lower saturated alkoxy; and one Y represents a radical selected from the group consisting of $-OH$ and lower saturated alkoxy and the other Y represents hydrogen; acidifying the resulting polyalkali metal salt obtained to form the corresponding free mono-orthophosphoric acid ester of the dihydroxy chalcone, and treating the latter with an alkaline agent in amount sufficient to convert only the orthophosphoric acid group into the di-alkali metal salts thereof.

4. 3,4' - dihydroxy - 4 - methoxychalcone-4'-orthophosphoric acid ester.

5. 3,4' - dihydroxy-4-methoxychalcone-4' - disodium phosphate.

6. 4,4' - dihydroxy - 3 - methoxychalcone - 4'-orthophosphoric acid ester.

7. 4,4' - dihydroxy - 3 - methoxychalcone - 4'-disodium phosphate.

8. 4,4' - dihydroxy - 3 - methoxychalcone - 4 -orthophosphoric acid ester.

9. 4,4' - dihydroxy - 3 - methoxychalcone - 4 -disodium phosphate.

10. Process for the manufacture of 3,4'-dihydroxy - 4 - methoxychalcone-4'-orthophosphoric acid ester, comprising reacting in an alkaline aqueous medium an alkali metal salt of the orthophosphoric acid ester of p-hydroxy-acetophenone with isovanillin and acidifying the alkali metal salt obtained to the free ester.

11. Process for the manufacture of 3,4'-dihydroxy - 4 - methoxychalcone - 4' - orthophosphoric acid ester and the alkali metal salts thereof, comprising reacting in an alkaline aqueous medium an alkali metal salt of the orthophosphoric acid ester of p-hydroxy-acetophenone with isovanillin, acidifying the alkali metal salt obtained to the free ester, and treating the free orthophosphoric acid ester with an alkaline reagent to obtain the di-alkali metal salt thereof.

12. A process as in claim 11 in which the alkaline reagent is sodium hydroxide and the disodium phosphate of the chalcone is obtained.

13. Process for the manufacture of 4,4'-dihydroxy-3-methoxychalcone - 4' - orthophosphoric acid ester comprising reacting in an alkaline aqueous medium an alkali metal salt of the orthophosphoric acid ester of p-hydroxy-acetophenone with vanillin and acidifying the alkali metal salt obtained to the free ester.

14. Process for the manufacture of 4,4'-dihydroxy-3-methoxychalcone - 4' - orthophosphoric acid ester and the alkali metal salts thereof, comprising reacting in an alkaline aqueous medium an alkali metal salt of the orthophosphoric acid ester of p-hydroxy-acetophenone with vanillin, acidifying the alkali metal salt obtained to the free ester, and treating the free orthophosphoric acid ester with an alkaline reagent to obtain the di-alkali metal salt thereof.

15. A process as in claim 14 in which the alkaline reagent is sodium hydroxide and the disodium phosphate of the chalcone is obtained.

16. Process for the manufacture of 4,4'-dihydroxy-3-methoxychalcone - 4 - orthophosphoric acid ester comprising reacting in an alkaline aqueous medium p-hydroxy-acetophenone with an alkali metal salt of the orthophosphoric acid ester of vanillin and acidifying the alkali metal salt obtained to the free ester.

17. Process for the manufacture of 4,4'-dihydroxy-3 - methoxychalcone - 4 - orthophosphoric acid ester and the alkali metal salts thereof, comprising reacting in an alkaline aqueous medium p-hydroxy-acetophenone with an alkali metal salt of the orthophosphoric acid ester of vanillin, acidifying the alkali metal salt obtained to the free ester, and treating the free orthophosphoric acid ester with an alkaline reagent to obtain the di-alkali metal salt thereof.

18. A process as in claim 17 in which the alkaline reagent is sodium hydroxide and the disodium phosphate of the chalcone is obtained.

FRANZ BERGEL.
AARON COHEN.
JOHN WYNNE HAWORTH.
EDWARD GRAHAM HUGHES.

REFERENCES CITED

The following references are of record in the file of this patent:

UNITED STATES PATENTS

| Number | Name | Date |
| --- | --- | --- |
| 2,281,624 | Schussler et al. | May 5, 1942 |
| 2,380,716 | Baker | July 31, 1945 |
| 2,395,934 | Miescher et al. | Mar. 5, 1946 |

OTHER REFERENCES

Russell et al., J. Chem. Soc., 1937, pages 421–424.
Bargellini et al., Chem. Abstracts, vol 20, pages 592–593 (1926).